United States Patent
Rayis

(10) Patent No.: US 10,357,121 B2
(45) Date of Patent: *Jul. 23, 2019

(54) APPARATUS FOR COVERING AND PROTECTING AN EDIBLE ITEM

(71) Applicant: Paul Rayis, Scottsdale, AZ (US)

(72) Inventor: Paul Rayis, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,419

(22) Filed: Sep. 16, 2018

(65) Prior Publication Data

US 2019/0014933 A1    Jan. 17, 2019

Related U.S. Application Data

(63) Continuation-in-part of application No. 15/810,433, filed on Nov. 13, 2017, now Pat. No. 10,076,199, which is a continuation-in-part of application No. 14/926,103, filed on Oct. 29, 2015, now Pat. No. 9,814,336.

(60) Provisional application No. 62/074,824, filed on Nov. 4, 2014.

(51) Int. Cl.
*A47G 19/26*    (2006.01)
*F16B 17/00*    (2006.01)

(52) U.S. Cl.
CPC ............ *A47G 19/26* (2013.01); *F16B 17/004* (2013.01); *F16B 17/008* (2013.01)

(58) Field of Classification Search
CPC ....... A47G 19/26; A47G 19/265; A47G 19/30
USPC ....................................................... 220/9.4
See application file for complete search history.

(56) References Cited

U.S. PATENT DOCUMENTS

| | | | |
|---|---|---|---|
| 2,106,425 A | 1/1938 | Grant | |
| 2,206,635 A | 7/1940 | Hayes et al. | |
| 2,452,629 A * | 11/1948 | Bonekamp | B65D 59/00 229/906 |
| 2,844,471 A | 7/1958 | Boardway | |
| 3,133,550 A * | 5/1964 | Brown | A47G 19/26 135/154 |
| 3,180,739 A * | 4/1965 | Stoker | A21D 15/00 229/906 |
| 3,840,903 A * | 10/1974 | Mack | A41F 9/002 2/322 |
| 4,219,119 A | 8/1980 | Zefran | |
| 4,498,586 A | 2/1985 | Vitale | |
| 4,877,609 A | 10/1989 | Beck et al. | |
| 5,077,050 A | 12/1991 | Wall | |
| 5,173,070 A | 12/1992 | Gould | |
| 5,509,601 A | 4/1996 | Drabick | |

(Continued)

*Primary Examiner* — Steven A. Reynolds
*Assistant Examiner* — Javier A Pagan
(74) *Attorney, Agent, or Firm* — Invention to Patent Services; Alex Hobson

(57) ABSTRACT

An apparatus for covering and protecting an edible item that allows a flexible covering to cover and protect the edible item without damaging or altering a feature on the edible item. The edible item has a top surface with an outer edge. The apparatus provides a plurality of vertical supports, each having a first portion and a second portion. The second portion of each vertical support is inserted the top surface of the edible item adjacent to the outer edge. The first portion of each vertical support at least partially extends beyond the outer edge of the edible item, and the flexible covering can be supported by the plurality of vertical supports.

17 Claims, 11 Drawing Sheets

(56) References Cited

U.S. PATENT DOCUMENTS

| | | | |
|---|---|---|---|
| 7,195,397 B2 * | 3/2007 | Williamson | B65D 88/1612 |
| | | | 220/9.4 |
| 7,331,459 B2 | 2/2008 | Hilbourne | |
| 9,814,336 B2 * | 11/2017 | Rayis | A47G 19/26 |
| 10,076,199 B2 * | 9/2018 | Rayis | A47G 19/26 |

* cited by examiner

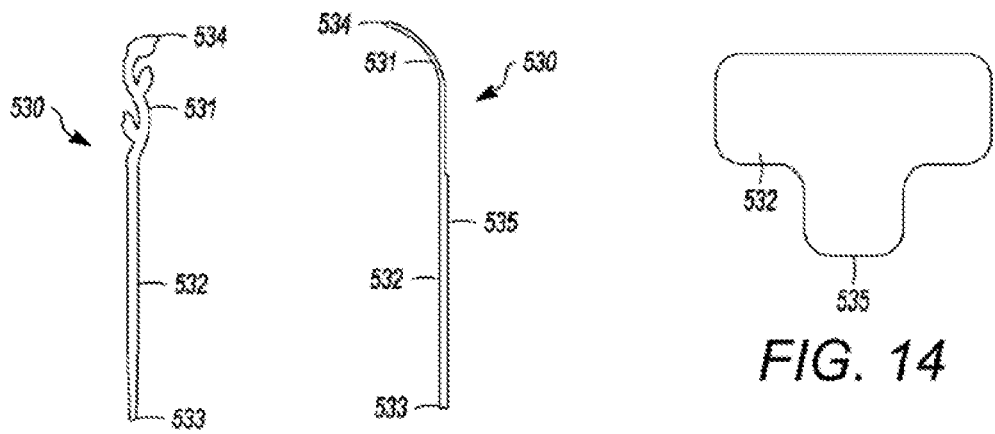
FIG. 12  FIG. 13
FIG. 14
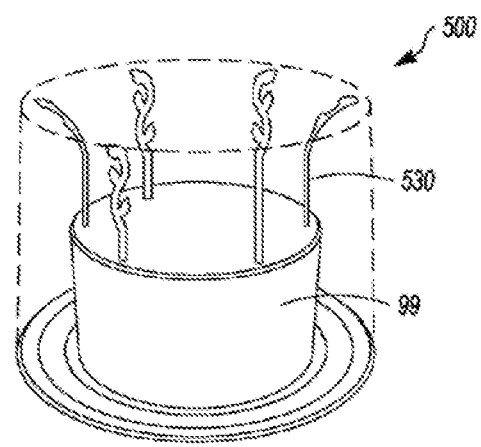
FIG. 15
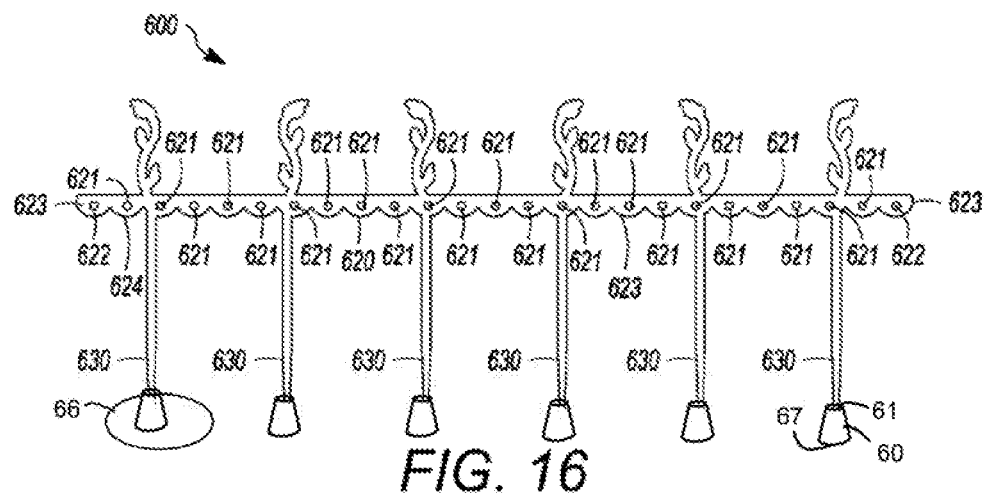
FIG. 16

APPARATUS FOR COVERING AND PROTECTING AN EDIBLE ITEM

CROSS-REFERENCE TO RELATED APPLICATION

This application is a continuation in part of U.S. patent application Ser. No. 15/810,433, filed on Nov. 13, 2017 and now issued as U.S. Pat. No. 10,076,199 on Sep. 18, 2018, which is a continuation in part of U.S. patent application Ser. No. 14/926,103, filed on Oct. 29, 2015 and issued as U.S. Pat. No. 9,814,336 on Nov. 14, 2017, which claims benefit of U.S. Provisional Application Ser. No. 62/074,824 filed on Nov. 4, 2014; the entirety of all applications are hereby incorporated by reference.

TECHNICAL FIELD

This disclosure relates to an apparatus for covering and protecting an edible item, and more particularly, an apparatus for covering and protecting an edible item, such as a cake or a pie that is compact and adjustable.

BACKGROUND

One of the easiest ways to protect an edible item, such as a cake, pie, or brownie, is to cover the edible item in the pan or container the edible item was made in with plastic wrap or aluminum foil. However, some edible items also contain toppings, icing, frosting, cream, or similar type of feature that can be damaged, destroyed or altered if the feature comes into contact with the plastic wrap or aluminum foil. Because of this, large hard covers are frequently used to protect the features on the edible item. However, hard covers can be cumbersome and undesirable because hard covers require a set amount of space that cannot be adjusted depending on the size of the edible item that is contained within the hard cover. As a result, hard covers frequently take up more space than what is actually necessary to adequately protect the features of the edible item. This can present a problem when the edible item must be stored within a refrigerator or when the hard cover is not in use.

According to a first embodiment, an apparatus for covering and protecting an edible item that allows a flexible covering to cover and protect the edible item without damaging or altering a feature on the edible item. The edible item has a top surface with an outer edge. The apparatus provides a plurality of vertical supports, each having a first portion and a second portion. The second portion of each vertical support is inserted the top surface of the edible item adjacent to the outer edge. The first portion of each vertical support at least partially extends beyond the outer edge, and the flexible covering can be supported by the plurality of vertical supports.

According to a second embodiment, an apparatus for covering and protecting an edible item that allows a flexible covering to cover and protect the edible item without damaging or altering a feature on the edible item. The apparatus provides a horizontal support and a plurality of vertical supports. The horizontal support has a surface to support the flexible covering and is adjustable to accommodate varying sizes and shapes of edible items. The vertical supports are attachable to the horizontal support.

According to a third embodiment, an apparatus for protecting an edible item supported by a base. The apparatus provides an elongated support having a tab formed on a first end, a plurality of corresponding slits formed adjacent to a second end that opposes the first end, and a plurality of tabs along a bottom edge. The elongated support may be bended around the edible item and the tab on the first end secured within one of the slits formed adjacent to the second end. Each of the plurality of tabs along the bottom edge can be bent perpendicular to secure the elongated support to the base.

An exemplary apparatus for covering and protecting an edible item may comprise a plurality of vertical supports that extend down from the horizontal support. The vertical supports may keep the horizontal supports above the edible item, thereby having a length or height greater than the edible item. The apparatus may further comprise base retainers for receiving the extended end of the vertical supports, or the end opposing the coupling with horizontal support. In an exemplary embodiment, the base retainers comprise an opening, such as an opening in the top of the base retainer to receive the extended end of the vertical support. The base retainer may have a non-slip surface on the bottom, to prevent the base retainer from slipping, such as on a plate or platter. The base retainers may be conical in shape to provide a larger contact surface along the bottom to increase friction. The base retainers may further comprise a tab that extends horizontally from the base retainer such that it extends to or away from the edible item. In an exemplary embodiment, the tabs may be positioned to extend toward the edible item and may extend into or under the edible item to secure the edible item in position with respect to the apparatus. In another embodiment, the tabs may extend away, such as radially away from the edible item, thereby securing the base retainer and apparatus with respect to a container which may prevent the edible item from moving with respect to the inside volume of the container. For example, the edible item may slid until one or more of the extended ends of the tab hit the container and prevent the edible item from slipping further and contacting the inside of the container. An exemplary tab may extend in a plurality of directions, such as both toward and away from the edible item and an exemplary tab may be circular to oval in shape. An exemplary tab may extend out radially from the base retainer, thereby providing a stop with the edible item and with a container or ridge of a plate or platter. An exemplary tab may be rectangular in shape, square in shape, round or oval in shape or irregularly shaped.

An exemplary apparatus for covering and protecting an edible item may comprise some vertical members that are configured to extend into the edible item and other vertical members that are configured to extend down around the outer perimeter of the edible item and these vertical members may comprise a base retainer to prevent sliding of die edible item and apparatus. Again, the base retainers may be coupled or attached to these outer vertical members, or vertical members that extend down around the outside of the edible item, or may be detachably attachable.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The various features, advantages, and other uses of the apparatus will become more apparent by referring to the following detailed description and drawings in which:

FIG. 12 is front elevation view of a fifth alternative embodiment of the apparatus for covering and protecting an edible item;

FIG. 13 is a side elevation view of the fifth alternative embodiment of the apparatus for covering and protecting an edible item;

FIG. 14 is an enlarged, cross-sectional view of the fifth alternative embodiment;

FIG. 15 is a perspective view showing the fifth alternative embodiment in use;

FIG. 16 is a front elevation view of a sixth alternative embodiment of the apparatus for covering and protecting an edible item;

Figure 1:
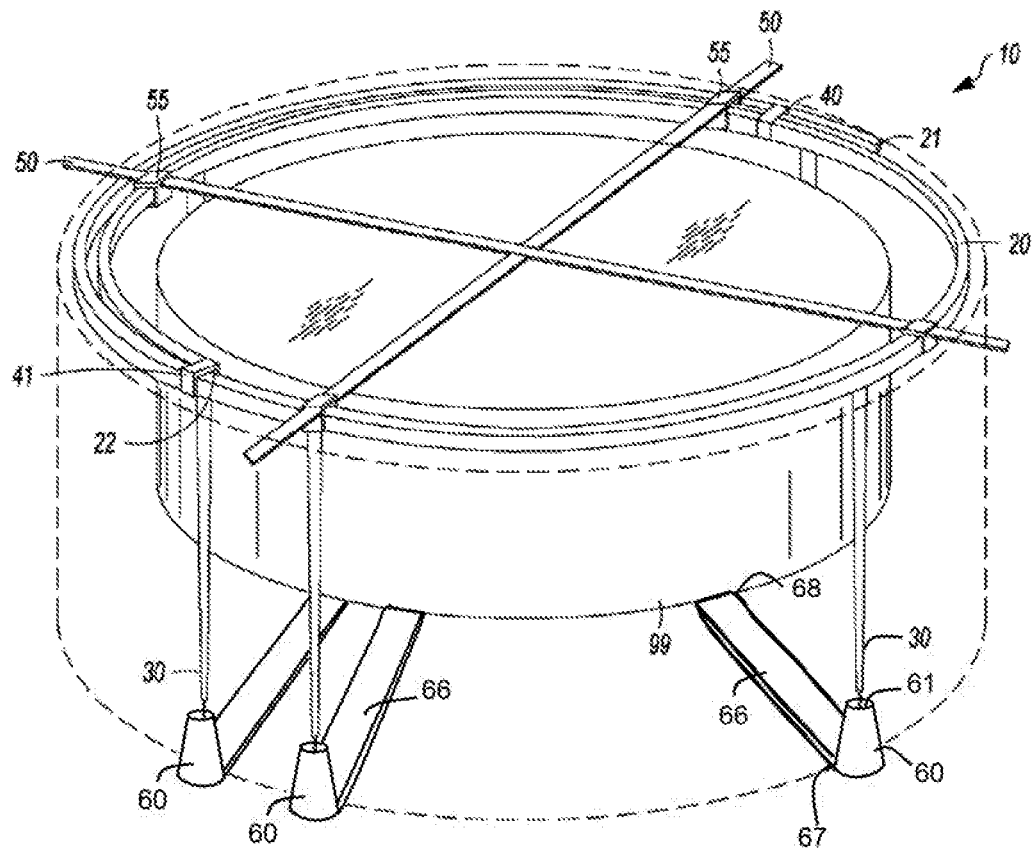
FIG. 1 is a perspective view of an apparatus for covering and protecting an edible item.

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

This disclosure relates to an apparatus for covering and protecting an edible item, such as a cake, pie, brownie, or other type of food, while using minimal space to store the edible item. The apparatus provides a surface to support a flexible covering such as plastic wrap, aluminum foil, cloth, paper sheet, etc., while also preventing the covering from coming into contact with features, such as toppings, icing, frosting, cream, or similar item that may be present on the edible item. The apparatus is adjustable and accommodates all shapes and sizes of edible items. The apparatus can be made of paper, plastic, metal, or any material that best suits the apparatus. As shown in FIG. 1, the apparatus 10 is comprised of a horizontal support 20 and a plurality of vertical supports 30. The horizontal support 20 may be made from a flexible material that allows the horizontal support 20 to bend as necessary to adjust and form the desired size of the horizontal support 20. The horizontal support 20 is positioned above the edible item 99 and may be configured as a ring. Although the horizontal support 20 is in the shape of a ring, the horizontal support 20 has two free ends 21, 22 that overlap to create the ring, which allows for the size of the ring to be adjusted easily.

Figures 2, 3:
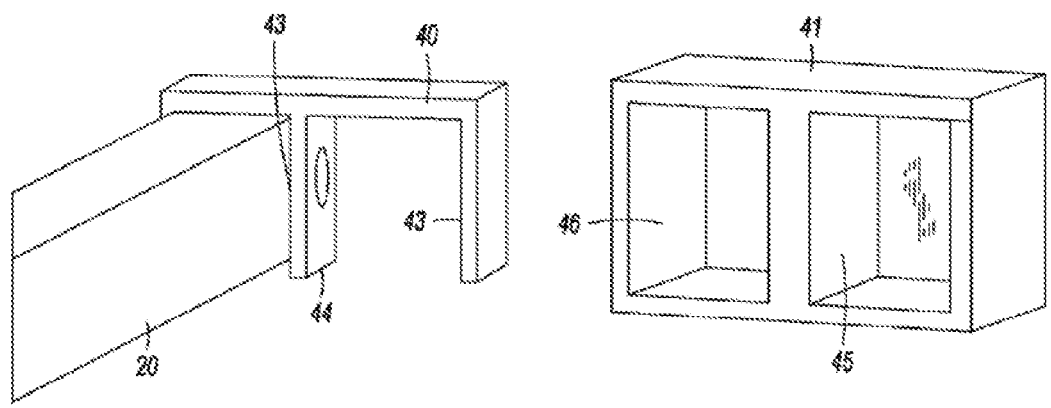
FIG. 2 is a perspective view of a horizontal support and a first clip of the apparatus for covering and protecting an edible item.
FIG. 3 is a perspective view of a second clip of the apparatus for covering and protecting an edible item.

To keep the horizontal support 20 in its desired configuration, various clips may be used. As shown in FIG. 1, a first clip 40 and a second clip 41 may be used in the overlapping portion near free ends 21, 22 of the horizontal support 20. As shown in FIG. 2, the first clip 40 may have two adjacent recesses 43 that have substantially the same configuration as the cross-section of the horizontal support 20, which gives the first clip 43 the ability to secure the horizontal support 20 in its desired configuration. The recesses 43 may have an open end 44 as shown, or may be closed on the end. As shown in FIG. 3, the second clip 41 has a recess 45 and an aperture 46. The horizontal support 20 extends through the aperture 46 in the second clip 41 and the free end 22 of the horizontal support 20 terminates in the recess 45 in the second clip 41. Various modifications of the clips are anticipated. For example, two first clips 40 could be used, or two second clips 41 could be used. As shown in FIG. 1, the vertical supports 30 may extend into a base retainer 60, having an opening 61 to receive the extended end of the vertical support. A tab 66 may extend from a coupled end 67, coupled with the base retainer, to an extended end 68, which may extend to, into or under the edible item 99, such as a cake, to further secure the edible item in pace within the apparatus 10. The tab may also extend radially away from the edible item to prevent a stop from sliding with respect to a carrier, such as a plate or container. The tab may hit a ridge on a place or an inside surface of a container to prevent the edible item and apparatus attached thereto from sliding further. The vertical supports may be coupled or attached to the base retainers and the tabs may be detachably attachable to the base retainer. A user may select a tab depending on the distance from the base retainer to the edible item.

Figure 4:
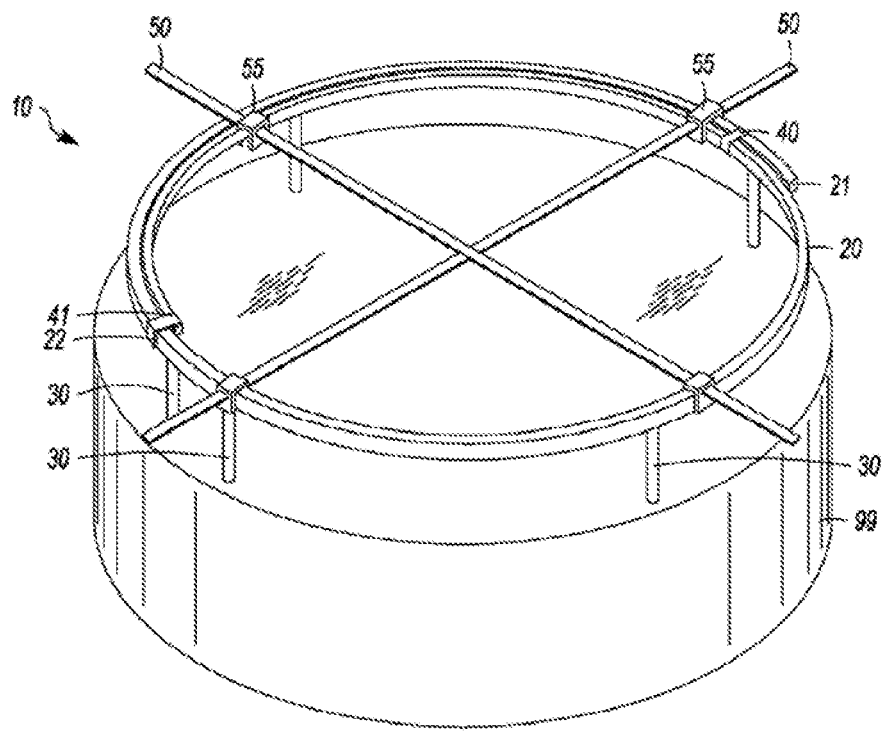
FIG. 4 is a perspective view of the apparatus for covering and protecting an edible item inserted into the edible item.

To elevate the horizontal support 20 above the edible item 99, the horizontal support 20 is attached to the plurality of vertical supports 30, with each of the vertical supports 30 extending downward toward the edible item 99. As shown in FIG. 4, the vertical supports 30 are fixedly attached to the horizontal support 20 and may be inserted directly into the edible item 99. The vertical supports 30 may have a substantially rectangular or circular cross-sectional configuration. As shown, the vertical supports 30 have a diameter of approximately 0.1 inches and a length of approximately 4 inches. However, the dimensions of the vertical supports 30 can vary depending on the edible item 99 the apparatus 10 is to be used in conjunction with. The vertical supports 30 may also be telescoping, such that the length of the vertical supports 30 can easily be adjusted to accompany varying sizes of edible items.

Figure 5:
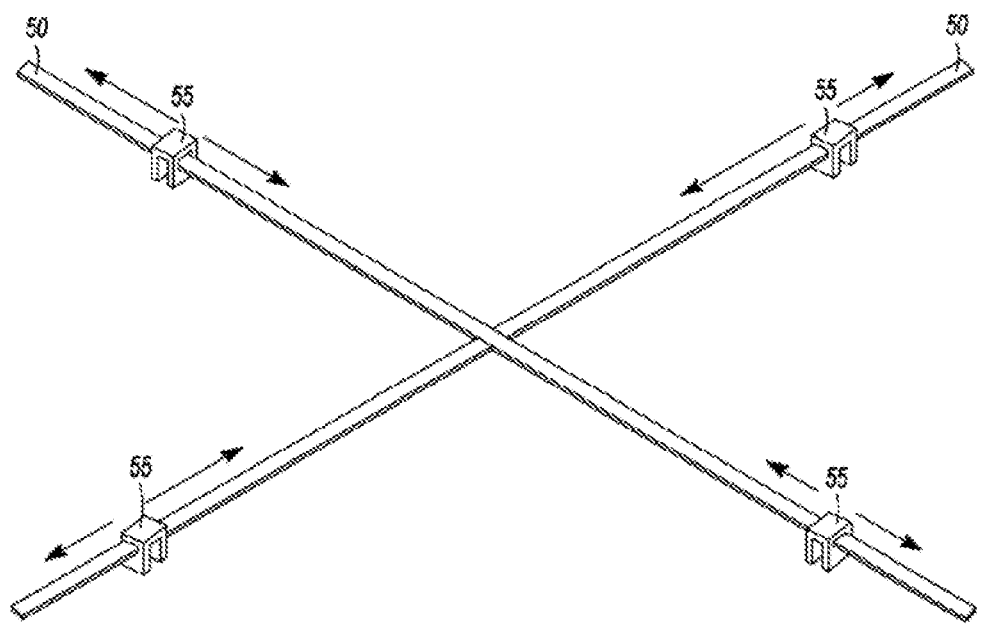
FIG. 5 is a perspective view of elongate bars of the apparatus for covering and protecting an edible item.
Figure 6:
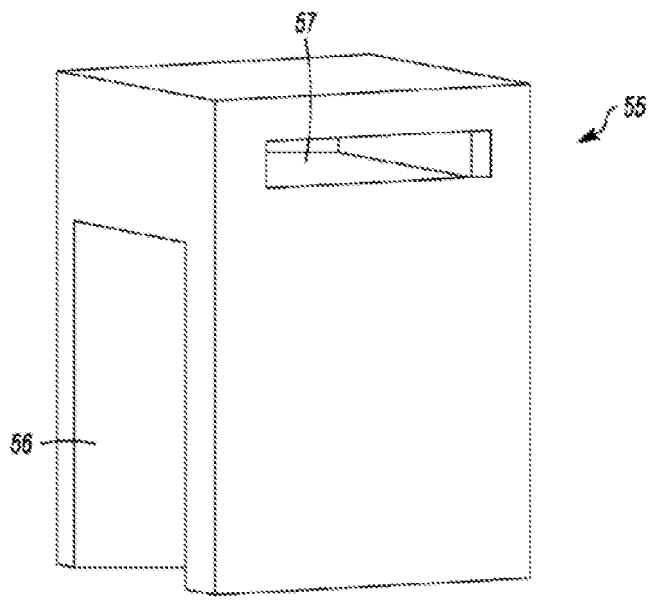
FIG. 6 is a perspective view of a clip for the elongate bars of the apparatus for covering and protecting an edible item.

To provide additional support for the flexible covering, elongate bars 50 may be provided. As shown in FIGS. 5-6, the elongate bars 50 cross near the center of the horizontal support 20. The elongate bars 50 may have rectangular cross-sectional configuration, but other cross-sectional configurations, such as circular, are possible. Each cross-bar 50 has a clip 55 that attaches the elongate bar 50 to the horizontal support 20 and can be adjusted along the elongate bar 50. The clips 55 may have a recess 56 that has substantially the same configuration as the cross-section of the horizontal support 20 to allow the clips 55 to easily attach to the horizontal support 20. The clips 55 may also have an aperture 57 extending through the clip 55 that has substantially the same configuration as the cross-section of the elongate bars 50, which allows the elongate bars 50 extend through the aperture 57.

To use the apparatus 10, the horizontal support 20 is adjusted to its desired size and secured by placing two clips 40 near each of the free ends 21, 22 of the horizontal support 20. The recess 41 in each of the clips 40 will fit securely over the horizontal support 20. The vertical supports 30 are placed either adjacent to the sides of the edible item 99 or directly into the edible item 99. If the vertical supports 30 are inserted into the edible item 99, the vertical supports 30 may be inserted approximately half-way into the edible item 99. Alternatively, the vertical supports 30 can be inserted to the bottom of the edible item 99. To add the elongate bars 50, the clips 55 on the elongate bars 50 are slid along the elongate bars 50 until the clips 55 are positioned directly above the horizontal support 20. The recess 56 in each of the clips 55 will fit securely over the horizontal support 20. The elongate bars 50 may extend past the horizontal support 20. Once the apparatus 10 is in place, the flexible covering is draped and wrapped over the apparatus 10 to cover and protect the edible item 99.

Figure 7:
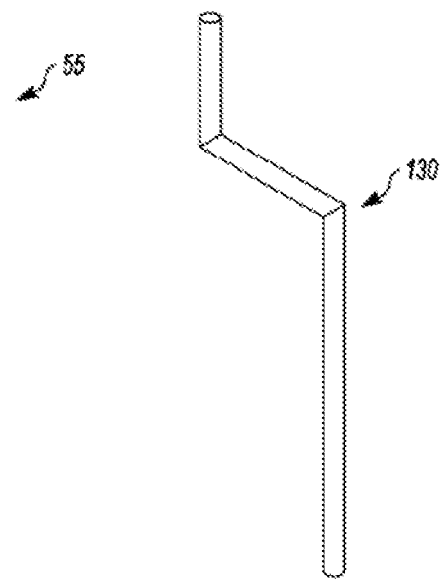
FIG. 7 is perspective view of a vertical support of a first alternative embodiment of the apparatus for covering and protecting an edible item.
Figure 8:
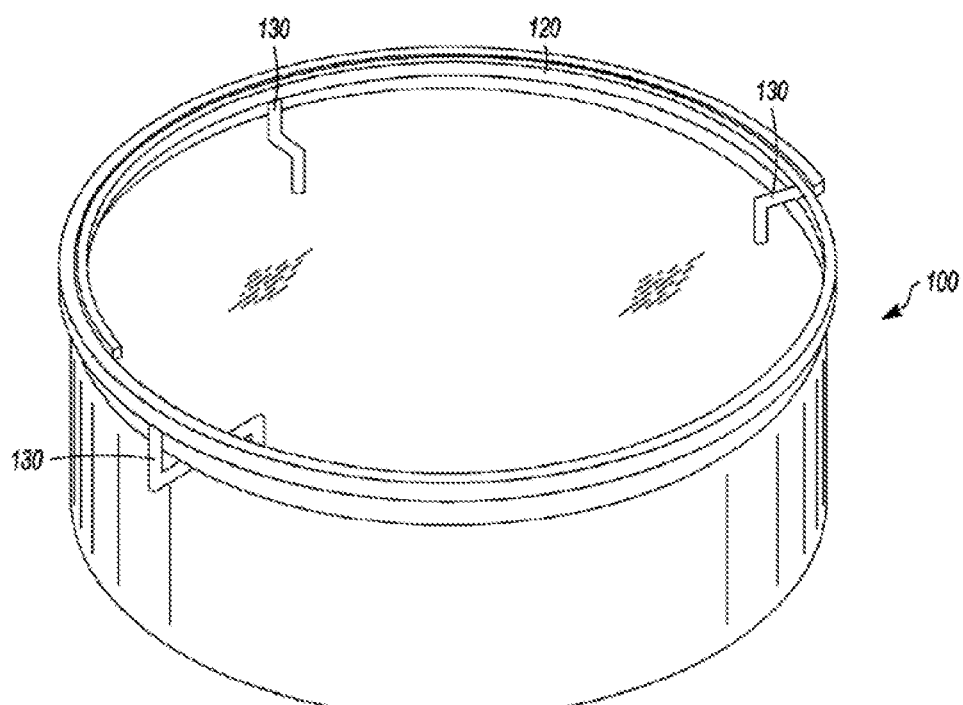
FIG. 8 is a perspective view of the first alternative embodiment of the apparatus for covering and protecting an edible item.

In a first alternative embodiment 100 of the apparatus 10, a plurality of vertical supports 130 may have a stepped-configuration as shown in FIGS. 7-8. The plurality of vertical supports 130 are otherwise similar to the plurality of vertical supports 30 with the exception of the stepped configuration. The stepped configuration allows a horizontal support 120 to extend beyond the edible item 99 when the vertical supports 130 are inserted directly into the edible item 99. The first alternative embodiment 100 of the apparatus 10 is used in the same manner as the apparatus 10.

Figure 9:
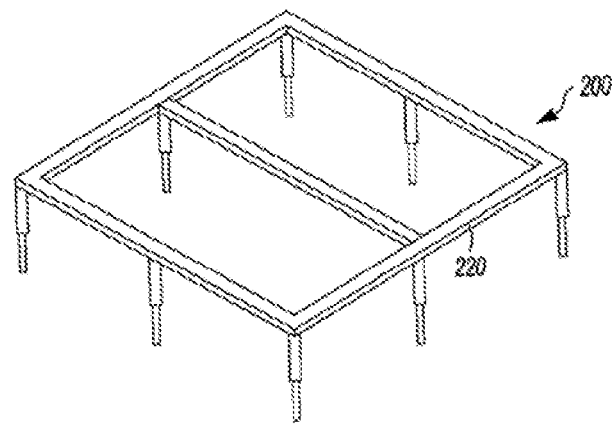
FIG. 9 is a perspective view of a second alternative embodiment of the apparatus for covering and protecting an edible item.

In a second alternative embodiment 200 of the apparatus 10, a horizontal support 220 may have a square or rectangular configuration, as shown in FIG. 9. The horizontal support 220 is otherwise similar to the horizontal support 20 with the exception of the square or rectangular configuration. The horizontal support 220 may be telescoping to allow for adjustment of the horizontal support 220. The square or rectangular configuration allows the second alternative embodiment 200 of the apparatus 10 to accommodate various shapes and sizes of edible items 99. The second alternative embodiment 200 of the apparatus 10 is used in the same manner as the apparatus 10.

Figure 10:
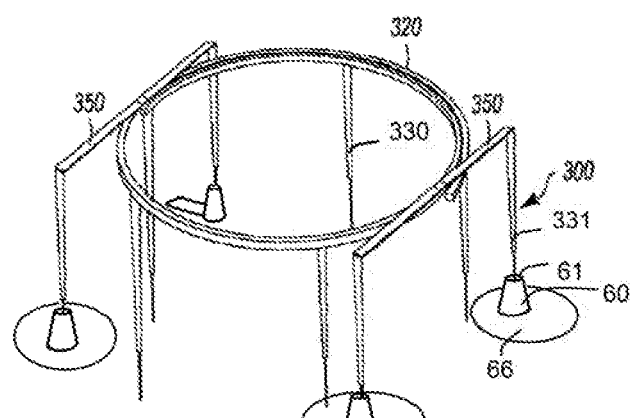
FIG. 10 is a perspective view of a third alternative embodiment of the apparatus for covering and protecting an edible item.

In a third alternative embodiment 300 of the apparatus 10, elongate bars 350 are attached running parallel to one another on opposing sides of a horizontal support 320, as shown in FIG. 10. The elongate bars 350 and the horizontal support 320 are otherwise similar to the elongate bars 50 and the horizontal support 20, respectively, with the exception of the placement of the elongate bars 350. Moving the elongate bars 350 to the sides of the horizontal support 320 allows the third alternative embodiment 300 of the apparatus 10 to accommodate various shapes and sizes of edible items 99. The third alternative embodiment 300 of the apparatus 10 is used in the same manner as the apparatus 10. The apparatus 10 shown in FIG. 10 has vertical supports 330 that are configured around the ring shaped horizontal support 320 and outer vertical supports 331 that extend down from the elongated bars 350. Vertical supports 330 may be configured to extend down into the edible item and the outer vertical supports 331 may configured with base retainers 60 to prevent slipping of the edible item apparatus during transport. Furthermore, one or more of the base retainers may comprise a tab 66 that extends out from the base retainer to create a stop with a carrying container or with the edible item. As shown, the tabs are circular in shape and extend radially out from the base retainer. This exemplary tab may create a stop with the edible item and with a container inside surface or rim. The outer vertical supports 331 may be longer than the vertical supports 330 configured to extend into the edible item. The base retainers may comprise an opening 61 for receiving the extended end of the outer vertical supports and may be detachably attachable.

Figure 11:
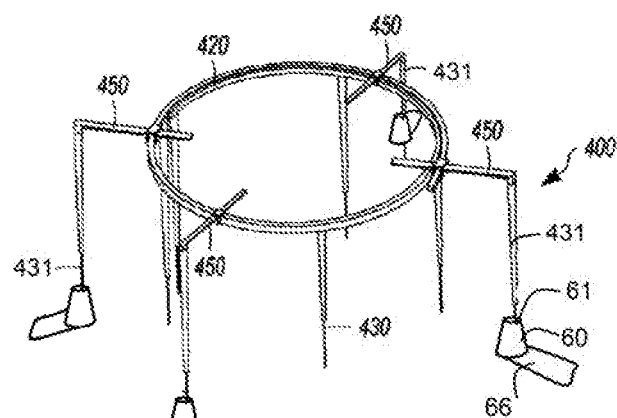
FIG. 11 is a perspective view of a fourth alternative embodiment of the apparatus for covering and protecting an edible item.

In a fourth alternative embodiment 400 of the apparatus 10, elongate bars 450 do not cross in the center of a horizontal support 420 and are instead supported by a vertical support 430 from a plurality of vertical supports 430, as shown in FIG. 11. The elongate bars 450, the horizontal support 420, and the plurality of vertical supports 430 are otherwise similar to the elongate bars 50, the horizontal support 20, and the plurality of vertical supports 30. Having the elongate bars 450 supported by the vertical supports 430 instead of crossing in the center of the horizontal support 420 allows the fourth alternative embodiment 400 of the apparatus 10 to accommodate various shapes and sizes of edible items 99. The fourth alternative embodiment 400 of the apparatus 10 is used in the same manner as the apparatus 10. The apparatus 10 shown in FIG. 11 has vertical supports 430 that are configured around the ring shaped horizontal support 420 and outer vertical supports 431 that extend down from the elongated bars 450. Vertical supports 430 may be configured to extend down into the edible item and the outer vertical supports 431 may be configured with base retainers 60 to prevent slipping of the edible item apparatus during transport. Furthermore, one or more of the base retainers may comprise a tab 66 that extends out from the base retainer to create a stop with a carrying container or with the edible item. As shown, the tabs extend radially out from the center of the apparatus, or away from the edible item in use. The outer vertical supports 431 may be longer than the vertical supports 430 configured to extend into the edible item. The base retainers may comprise an opening 61 for receiving the extended end of the outer vertical supports and may be detachably attachable.

FIGS. 12-15 illustrate a fifth alternative embodiment 500 of the apparatus 10 where only a plurality of vertical supports 530 are used to support the flexible covering. The plurality of vertical supports 530 have an elongated configuration with a first portion 531 and a second portion 532. The first portion 531 may have a concave, arcuate configuration that allows the vertical support 530 to extend beyond the outer edge of the edible item 99 when the vertical support 530 is inserted into the edible item 99. The first portion 531 may also have a decorative touch, such as the ivy leaves shown. The second portion 532 may have a substantially T-shaped cross-sectional configuration as shown in FIG. 14 to provide support and keep the vertical support 530 upright when it is inserted into the edible item 99. An end 533 of each vertical support 530 may be tapered to assist with inserting the vertical support 530 into the edible item 99.

The height of each vertical support 530 greatly exceeds both the width and thickness of the vertical support 530. In the illustrated example, the vertical supports 530 have a height of 9.49 inches. The width of the first portion 531 is 9.85 inches, and the width of the second portion 532 is 0.25 inches. The thickness of each vertical support 530, measured left to right from an end 534 of the concave configuration of the first portion 531 to an end 535 of the T-shaped configuration of the second portion 532, is 1.52 inches.

To use the fifth alternative embodiment 500 of the apparatus 10, the tapered end 533 and second portion 532 of each vertical support 530 is inserted into the edible item 99 near the outer edge of the edible item 99. The vertical supports 530 are inserted into the edible item 99 such that the end 534 of the first portion 531 extends beyond the outer edge of the edible item 99. The vertical supports 530 are spaced an equal distance from one another around the outer edge of the edible item 99. The flexible covering is then draped over the vertical supports 530 and supported by the first portion 531 of the vertical supports 530.

Figure 17:
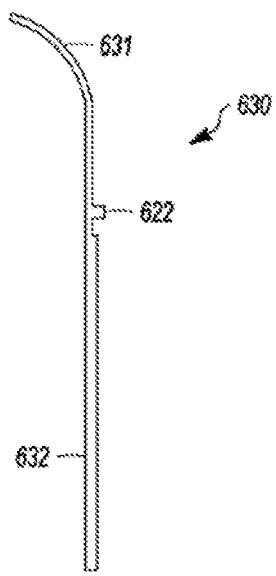
FIG. 17 is a side elevation view of the sixth alternative embodiment of the apparatus for covering and protecting an edible item.
Figure 18:
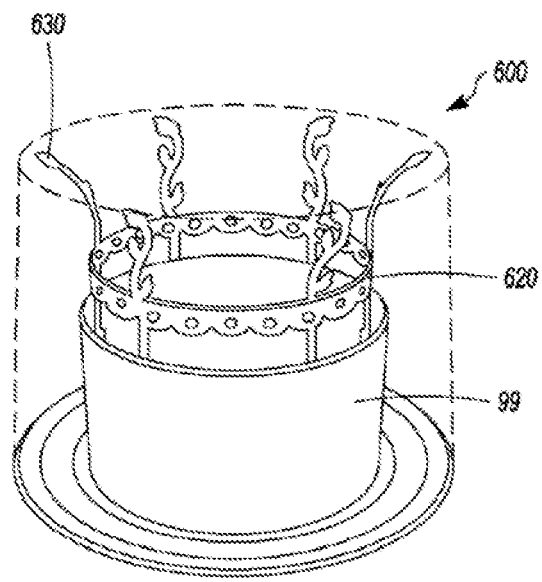
FIG. 18 is a perspective view showing the sixth alternative embodiment in use.

A sixth alternative embodiment 600 of the apparatus 10 is shown in FIGS. 16-18. The sixth alternative embodiment 600 includes a plurality of vertical supports 630 that are similar to the plurality of vertical supports 530 of the fifth alternative embodiment 500 with the exception that the plurality of vertical supports 530 are connected to one another with the addition of a horizontal support 620. The horizontal support 620 is connected to each vertical support 630 between a first portion 631 having a concave configuration and a second portion 632 having a T-shaped cross-sectional configuration. The plurality of vertical supports 530 are equally spaced along the horizontal support 620. In the illustrated example, the horizontal support 620 is 25 inches long and the vertical supports 530 are spaced at 4-inch intervals. As shown in FIG. 16, a base retainer 60 is configured on the extended end of the vertical supports 630. Again, these may be detachably attachable or attached. A tab 66 may be configured on one or more of the base retainers to create a stop with the edible item and/or with a container.

The horizontal support 620 can have a substantially rectangular cross-sectional configuration, although other configurations are possible. The horizontal support 620 includes a plurality of equally spaced, substantially similar apertures 621 and protrusions 622 on each end 623. The apertures 621 and the protrusions 622 are sized and configured such that a protrusion can be held in a friction fit in any of the apertures 621. As shown, the bottom edge 624 of the horizontal support 620 has a decorative, scalloped configuration that centers on each aperture 621.

Similar to the fifth alternative embodiment 500, the sixth alternative embodiment 600 is used by inserting the vertical supports 630 into the edible item 99 adjacent to the outer edge such that the first portion 631 of each vertical support 630 extends beyond the outer edge of the edible item 99. Because the vertical supports 630 are connected to one another the horizontal support 620, all of the vertical supports 630 are inserted at substantially the same time. Once all of the vertical supports 630 have been inserted into the edible item 99, the ends of the horizontal support 620 should overlap to create a closed loop. The protrusions 622 can then be snapped into the aperture 621 on the horizontal support 670 that the protrusions 622 are closest to provide additional support for the flexible covering that is then draped over the edible item 99. Snapping both protrusions 622 into an aperture 621 helps deal with excess slack that may result. If the ends of the horizontal support 620 do not overlap, multiple horizontal supports 620 can be connected together by snapping a protrusion 622 on first horizontal support 620 into an aperture 621 on a second horizontal support 620.

Figure 19:
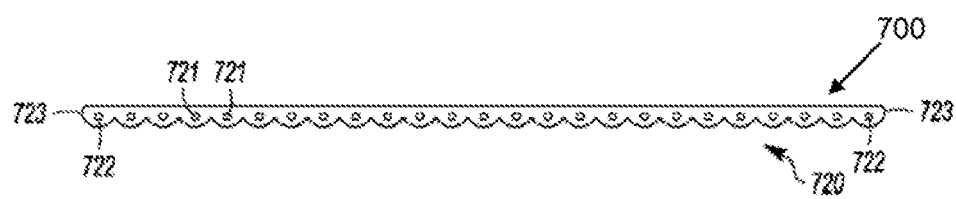
FIG. 19 is a front elevation view of a horizontal support for a seventh embodiment of the apparatus for covering and protecting an edible item.
Figure 20:
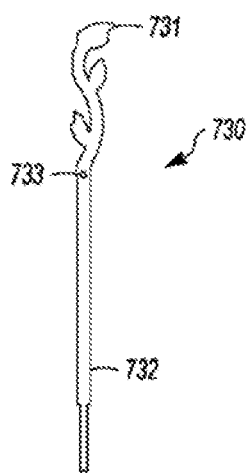
FIG. 20 is a front elevation view of a vertical support for the seventh embodiment of the apparatus for covering and protecting an edible item.
Figure 21:
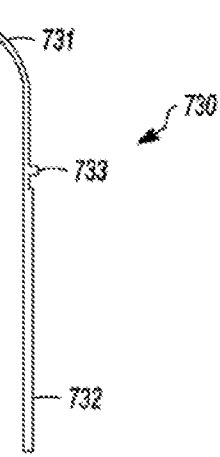
FIG. 21 is a side elevation view of the vertical support for the seventh embodiment of the apparatus for covering and protecting an edible item.
Figure 22:
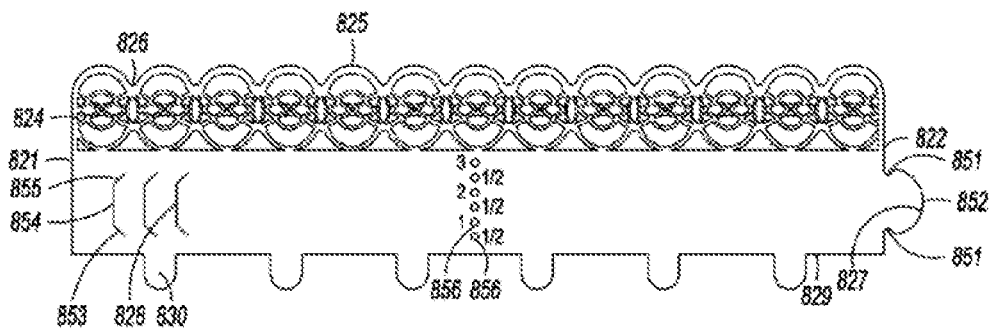
FIG. 22 is a front elevation view of an eighth alternative embodiment of the apparatus for covering and protecting an edible item.
Figure 23:
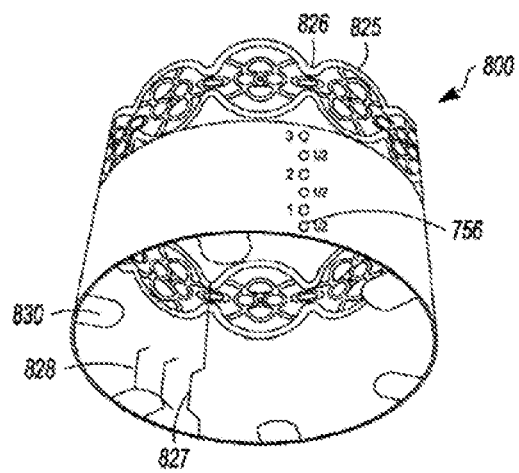
FIG. 23 is a perspective view of the eighth alternative embodiment of the apparatus for covering and protecting an edible item.
Figure 24:
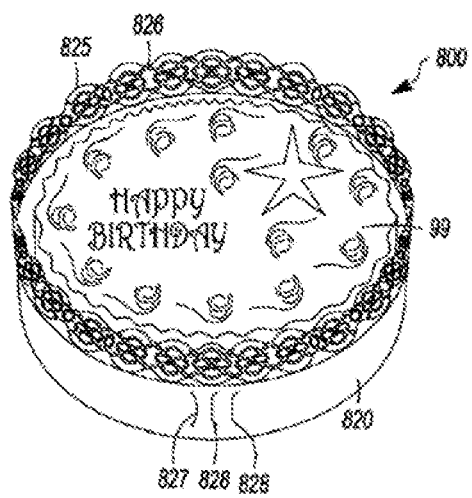
FIG. 24 is a perspective view of the eighth alternative embodiment in use.

Shown in FIGS. 19-21 is a seventh alternative embodiment 700 of the apparatus 10 that is similar to the sixth alternative embodiment 700 with the exception that a horizontal support 720 is removably attachable to a plurality of vertical supports 730. Similar to the horizontal support 620, the horizontal support 720 includes a plurality of substantially similar apertures 721 and protrusions 722 formed on each end 723 of the horizontal support 720. The apertures 721 and the protrusions 722 are sized and configured such that a protrusion 722 can be held in a friction fit in any of the apertures 721. Each of vertical supports 730 provides a protrusion 731 that is substantially similar to the protrusions 722 on the horizontal support 720, which allows the protrusions 733 the vertical supports 730 to similarly be held in a friction fit in any of the apertures 721 on the horizontal support 720. The protrusions 733 are formed between a first portion 731 and a second portion 732 of the vertical support 730.

The seventh alternative embodiment 700 is used in manner similar to the sixth alternative embodiment 600 with the exception that the horizontal support 720 is attached to the vertical supports 730 either before or after the vertical supports 730 are inserted into the edible item 99. The horizontal support 720 is secured to each of the vertical supports 730 by snapping the protrusion 733 on the vertical support 730 into one of the apertures 721 on the horizontal support 720. If the vertical supports 730 are inserted into the edible item 99 before the horizontal support 720 is attached to the vertical supports 730, it will be necessary to select the closest aperture 721 on the horizontal support 720.

FIGS. 22-25 show an eighth alternative embodiment 800 of the apparatus 10 that utilizes a horizontal support 820 that may be die cut. The horizontal support 820 extends longitudinally from a first end 821 to a second end 822 and is comprised of a lower portion 823 and an upper portion 824. The upper portion 824 may include a decorative element such as the cut-outs shown in the illustrated example. An upper edge 825 of the upper portion 824 may include a plurality of indents 826 that correspond to the sizing of an individual serving of the edible item 99. Although the height of the horizontal support 820 can vary, the horizontal support 820 is typically taller than the edible item 99 it will protect.

The lower portion 823 is substantially solid with a tab 827 extending from the second end 822. At least one slit 828 is formed in the lower portion 823 near the first end 822. The tab 827 and slits 828 are sized and configured such that the tab 827 can be secured in one of the slits 828. As shown, the tab 827 is comprised of two opposing, concave arcuate segments 851 connected by a larger, convex arcuate segment 852, and each of the slits 828 is formed by three adjoined cuts 853-855 through the lower portion 823 of the horizontal support 820. The middle cut 854 is substantially parallel to the first end 821 of the horizontal support 820, and the side cuts 853, 855 are angled toward the middle cut 854. The lower portion 823 can include a plurality of apertures 856 that are aligned vertically and spaced from a bottom edge 829 of the lower portion 821.

Along the bottom edge 829 of the lower portion 821, a plurality of tabs 830 are formed that are spaced in an equidistance manner. As illustrated, there are six tabs 830 that have a convex arcuate configuration on an end 831 that opposes the bottom edge 829 of the horizontal support 820. The tabs 830 are sized such that the tabs 830 can be easily folded perpendicular to the bottom edge 821 of the horizontal support 820.

Figure 25:
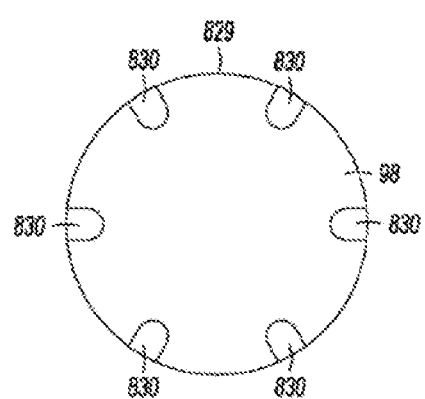
FIG. 25 is a bottom elevation view of the eighth alternative embodiment in use.

To use the eighth alternative embodiment 800 of the apparatus 10, the horizontal support 820 is beaded to fit around the edible item 99 that is sitting on a plate, cake round, or similar type of tray 98. The tab 827 on the horizontal support 820 is secured within the closest slit 828 such that horizontal support 820 is slightly larger than the edible item 99. Because the horizontal support 820 is typically taller than the edible item 99, the upper edge 825 of the horizontal support 820 will be above the top surface of the edible item. To keep the horizontal support 820 away from the plate 98 although the two are in close proximity, each of the plurality of tabs 830 along the bottom edge 829 of the horizontal support 820 are bent perpendicular until the tabs 830 touch the plate 98, which is shown in FIG. 25. With the horizontal support 820 around the edible item 99, the plurality of apertures 856 can be used to mark or add a decorative touch the edible item 99. If desired, a flexible covering can be draped over the upper edge 825 of the horizontal support 820. When it is time to serve the edible item 99, the plurality of indents 826 can be used to cut the edible item 99 into individual servings.

Figure 26:
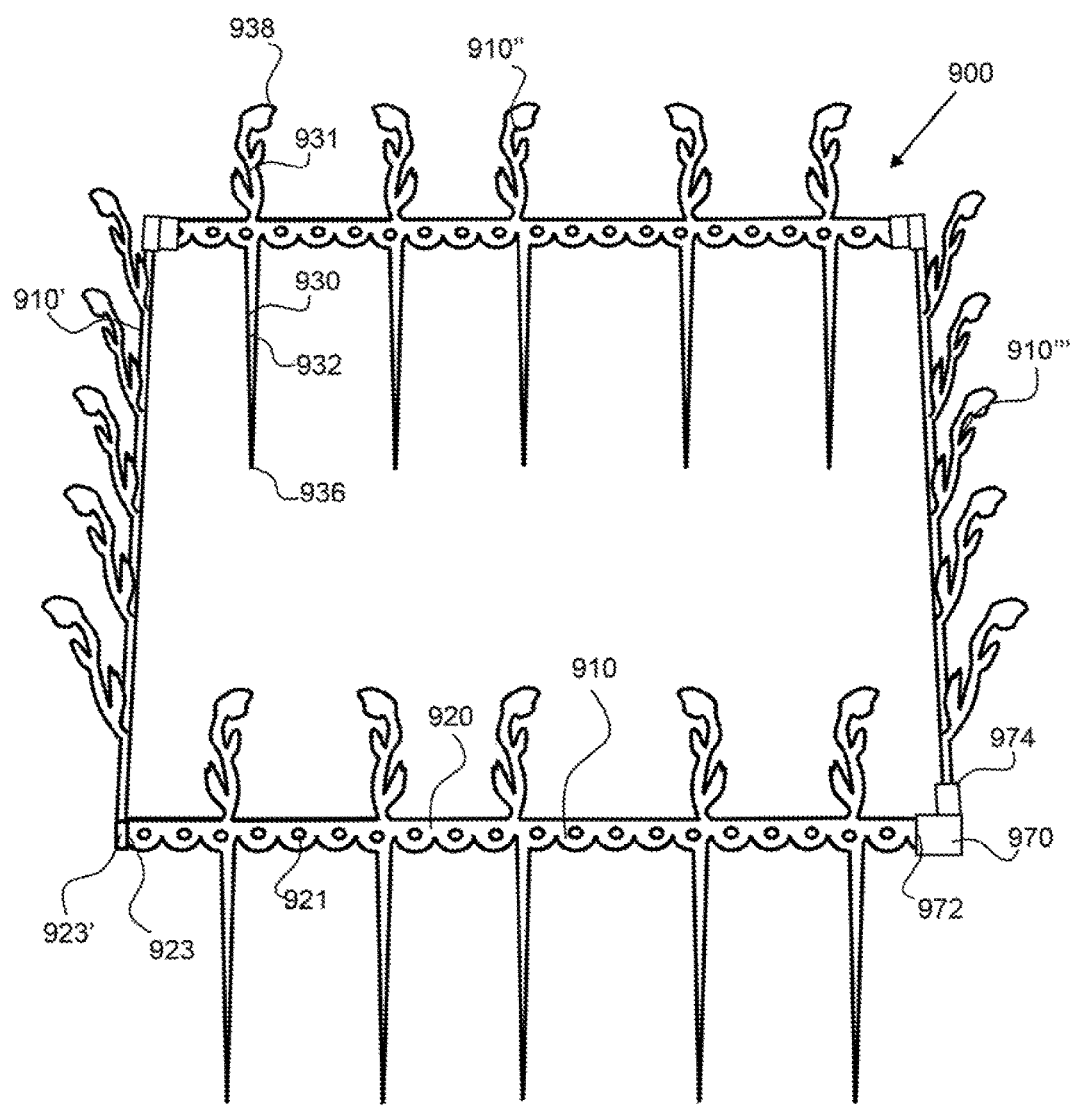
FIG. 26 shows a perspective view of an exemplary support apparatus having support assemblies attached to from rectangular support.
Figure 27:
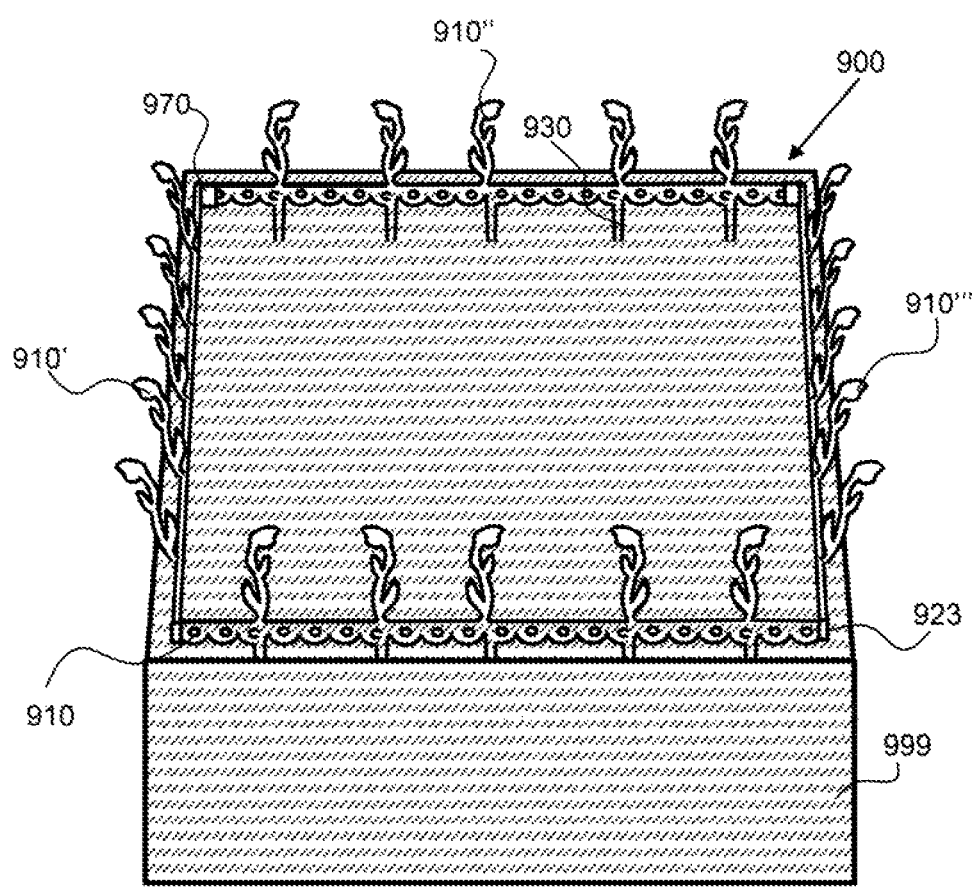
FIG. 27 shows a perspective view of the exemplary support apparatus of FIG. 26 configured in an edible item.

Referring to FIGS. 26 and 27, an exemplary support apparatus 900 has support assemblies 910-910''', that are attached to from rectangular support. The support assemblies have a vertical support 930 portion and a horizontal support 920 portion and the ends 923 of the horizontal supports are coupled together by corner retainers 970. The corner retainers have a first horizontal support portion 972 and second horizontal support portion 974 for attachment to the horizontal supports. The vertical support portions have an insertion end 936 for insertion into an edible item and an extended end 938 that extend out from the horizontal support 920. As shown in FIG. 27 the support apparatus 900 is configured in and on an edible item 999. The edible item is a square cake.

Figure 28:
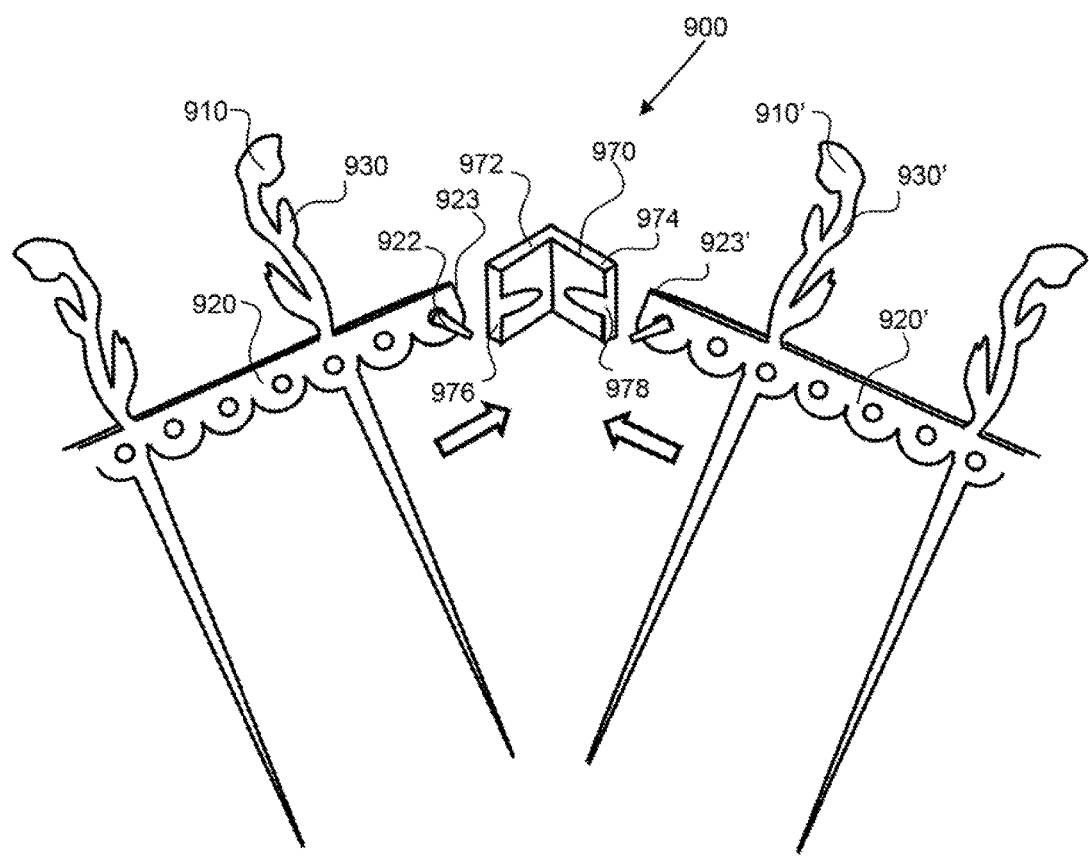
FIG. 28 shows a perspective view of two support assemblies being coupled together by a corner retainer.

As shown in FIG. 28, two support assemblies 910, 910' are being coupled together by a corner retainer 970. The corner retainer has a first horizontal support portion 972 and second horizontal support portion 974. The first horizontal support portion 972 has an insertion slot 976 for receiving the end 923 of the first horizontal support 920'. The slot may comprise an opening for receiving a horizontal support protrusion 922. Likewise, the second horizontal support portion 974 of the corner retainer has an insertion slot 978 for receiving the end 923' of the second horizontal support 920'. The corner retainer 970 may be configured on the ends of the horizontal support or on one end of a horizontal support and along the length of horizontal support. The corner retainer slots 976, 978, may be configured substantially orthogonally to each other such that the corner retainer secures the horizontal supports at substantially orthogonal or perpendicular directions, along the length of the horizontal supports. The support protrusions may be detachable or a protrusion insert.

Figure 29:
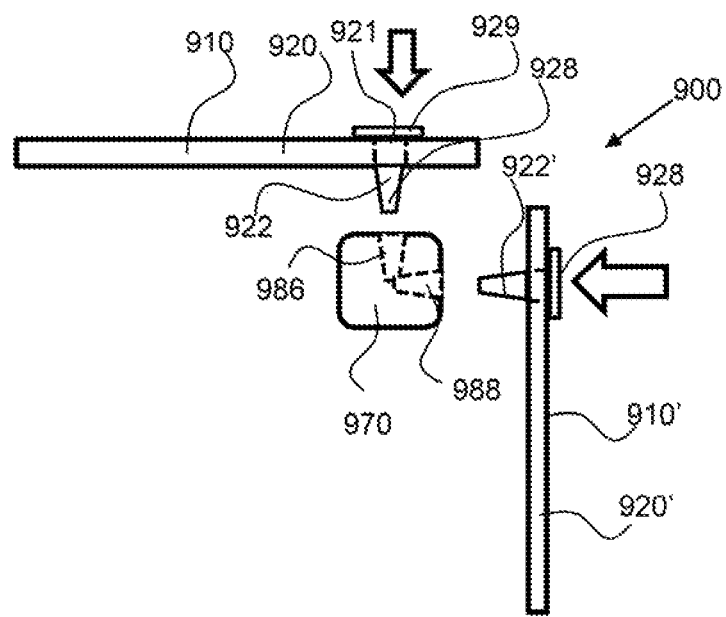
FIGS. 29 and 30 show a top view of two support assemblies being coupled together by a corner retainer having an aperture for receiving horizontal support protrusions.
Figure 30:
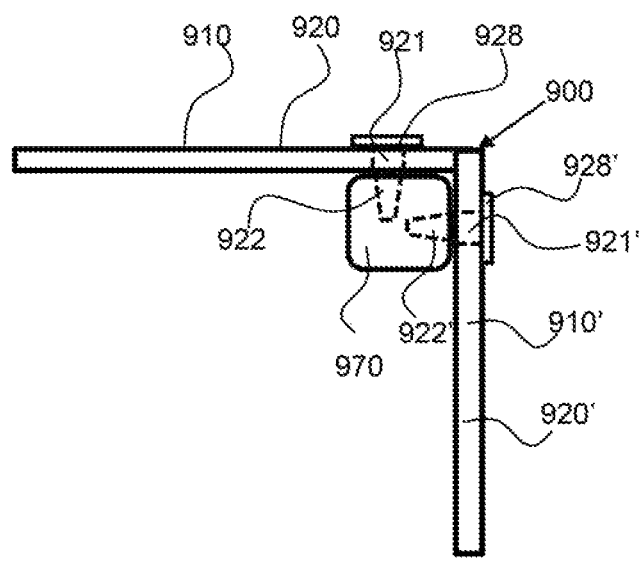

As shown in FIGS. 29 and 30, a support assembly 900 is being coupled together by a corner retainer 970 having apertures 986, 988 for receiving horizontal support protrusions 922, 922', respectively. The horizontal support protrusions are protrusion inserts 928, wherein there are separate pieces from the horizontal support that are inserted through an aperture 921 in the horizontal support. The protrusion insert has a flange 929 that prevent the protrusion insert from pushing through the aperture from the outside surface to the inside surface. The extended end of the protrusion insert extends into an aperture 986 in the corner retainer 970. The apertures 986, 988 in the corner retainer 970 are configured substantially orthogonally to each other, wherein the extend in orthogonal or substantially perpendicular directions, within about 20 degrees of being perpendicular or from about 70 degrees to about 110 degrees. The apertures may be configured with a geometric fit feature that mates with a geometric feature of the horizontal support protrusion to create an interference fit to secure the horizontal support assembly 910 to the corner retainer 970. As shown in FIG. 30 the horizontal supports 920 and 921 are secured to the corner retainer in a substantially orthogonal orientation, wherein the horizontal supports extend from the corner retainer in substantially orthogonal directions to each other. It is to be noted that the horizontal protrusions may be part of the horizontal support, such as being molded with the horizontal support wherein they are a one-piece unit with the horizontal support.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An apparatus for covering and protecting an edible item that allows a flexible covering to cover and protect the edible item without damaging or altering a feature on the edible item, the edible item having a top surface with an outer edge, the apparatus comprising:
 a plurality of vertical supports that are spaced apart from each other and each having an elongated configuration, each vertical support from the plurality of vertical supports having:
  a first portion that is positioned above the top surface of the edible item,
  an elongate second portion that extends down around an outer perimeter of the edible item to an extended end;
  a protrusion formed between the first portion and the elongate second portion;
  a base retainer configured on the extended end of at least a portion of the plurality of vertical supports; and
 a plurality of horizontal supports, each having a plurality of spaced apart apertures, wherein the protrusion on each vertical support can be secured by a friction fit within an aperture from the plurality of spaced apart apertures on at least one of the plurality of horizontal supports to allow movement of each vertical support between an attached position relative to the at least one horizontal support and a removed position relative to the at least one horizontal support, and wherein the flexible covering can be supported by the plurality of vertical supports; and
 a corner retainer configured between and coupling a first and second horizontal support together.

2. The apparatus for covering and protecting an edible item of claim 1, wherein the corner retainer has an insertion slot for receiving an end of one of the plurality of horizontal supports.

3. The apparatus for covering and protecting an edible item of claim 2, wherein the corner retainer has a first insertion slot and a second insertion slot, wherein the first insertion slot extends substantially orthogonally to the second insertion slot.

4. The apparatus for covering and protecting an edible item of claim 1, wherein the corner retainer has an aperture for receiving a protrusion extending from one of the plurality of horizontal supports.

5. The apparatus for covering and protecting an edible item of claim 1, wherein the plurality of horizontal supports includes four horizontal supports configured into a rectangular shape; wherein the four horizontal support have ends, and wherein the ends of the four horizontal supports are coupled together by corner retainers.

6. The apparatus for covering and protecting an edible item of claim 1, wherein the plurality of horizontal supports includes a pair of horizontal supports having a first length and a pair of horizontal supports having a second length, and wherein the first length is greater than the second length and wherein the four horizontal supports have ends and wherein the four horizontal supports are configured into a rectangular shape; wherein the ends of the four horizontal supports are coupled together by corner retainers.

7. The apparatus for covering and protecting an edible item of claim 1, wherein the base retainer comprises an opening for receiving the extended end of the vertical support and wherein the base retainer is detachably attachable to the vertical support.

8. The apparatus for covering and protecting an edible item of claim 1, further comprising a tab that is coupled to the base retainer and extends horizontally from the base retainer.

9. The apparatus for covering and protecting an edible item of claim 1, wherein the base retainer is coupled to an outer vertical support, wherein said outer vertical support is configured to extend down around an outer perimeter of said edible item.

10. The apparatus for covering and protecting an edible item of claim 9, wherein a portion of the vertical supports are configured inside of the outer vertical supports and are configured to extend into said edible item.

11. An apparatus for covering and protecting an edible item that allows a flexible covering to cover and protect the edible item without damaging or altering a feature on the edible item, the edible item having a top surface with an outer edge, the apparatus comprising a plurality of support assemblies, each comprising:
 a plurality of vertical supports that are spaced apart from each other and each has an elongated configuration, each vertical support from the plurality of vertical supports having:
  a first portion that is positioned above the top surface of the edible item;
  an elongate second portion that extends down around an outer perimeter of the edible item to an extended end; and
  a base retainer configured on the extended end of at least a portion of the plurality of vertical supports; and
 a plurality of horizontal supports that extends between the plurality of vertical supports;
 a corner retainer configured between and coupling a first and second support assembly together to form a rectangular support apparatus.

12. The apparatus for covering and protecting an edible item of claim 11, wherein the corner retainer has an insertion slot for receiving an end of a horizontal support from said plurality of horizontal supports.

13. The apparatus for covering and protecting an edible item of claim 11, wherein the corner retainer has an aperture for receiving a protrusion extending from a horizontal support from said plurality of horizontal supports.

14. The apparatus for covering and protecting an edible item of claim 11, wherein the plurality of horizontal supports includes a pair of horizontal supports having a first length and a pair of horizontal supports having a second length, and wherein the first length is greater than the second length and wherein the four horizontal supports have ends and a configured into a rectangular shape; wherein the ends of the four horizontal supports are coupled together by corner retainers.

15. The apparatus for covering and protecting an edible item of claim 11, wherein the base retainer comprises an opening for receiving the extended end of the vertical support and wherein the base retainer is detachably attachable to the vertical support.

16. The apparatus for covering and protecting an edible item of claim 11, further comprising a tab that is coupled to the base retainer and extends horizontally from the base retainer.

17. An apparatus for covering and protecting an edible item that allows a flexible covering to cover and protect the edible item without damaging or altering a feature on the edible item, the edible item having a top surface with an outer edge, the apparatus comprising:

a plurality of vertical supports that are spaced apart from each other and each has an elongated configuration, each vertical support from the plurality of vertical supports having:

a first portion that is positioned above the top surface of the edible item and at least partially extends beyond the outer edge of the edible item, an elongate second portion that is inserted into the top surface of the edible item adjacent to the outer edge of the edible item, and a protrusion formed between the first portion and the elongate second portion; and at least one horizontal support having a plurality of spaced apart apertures, a base retainer configured on an extended end at least a portion of the plurality of vertical supports; and wherein the protrusion on each vertical support can be secured by a friction fit within one aperture from the plurality of spaced apart apertures on the at least one horizontal support to allow movement of each vertical support between an attached position relative to the at least one horizontal support and a removed position relative to the at least one horizontal support, and wherein the flexible covering can be supported by the plurality of vertical supports.

\* \* \* \* \*